April 26, 1960     L. E. GILREATH     2,934,044
HYDRAULIC MOTOR
Filed June 15, 1959     4 Sheets-Sheet 1
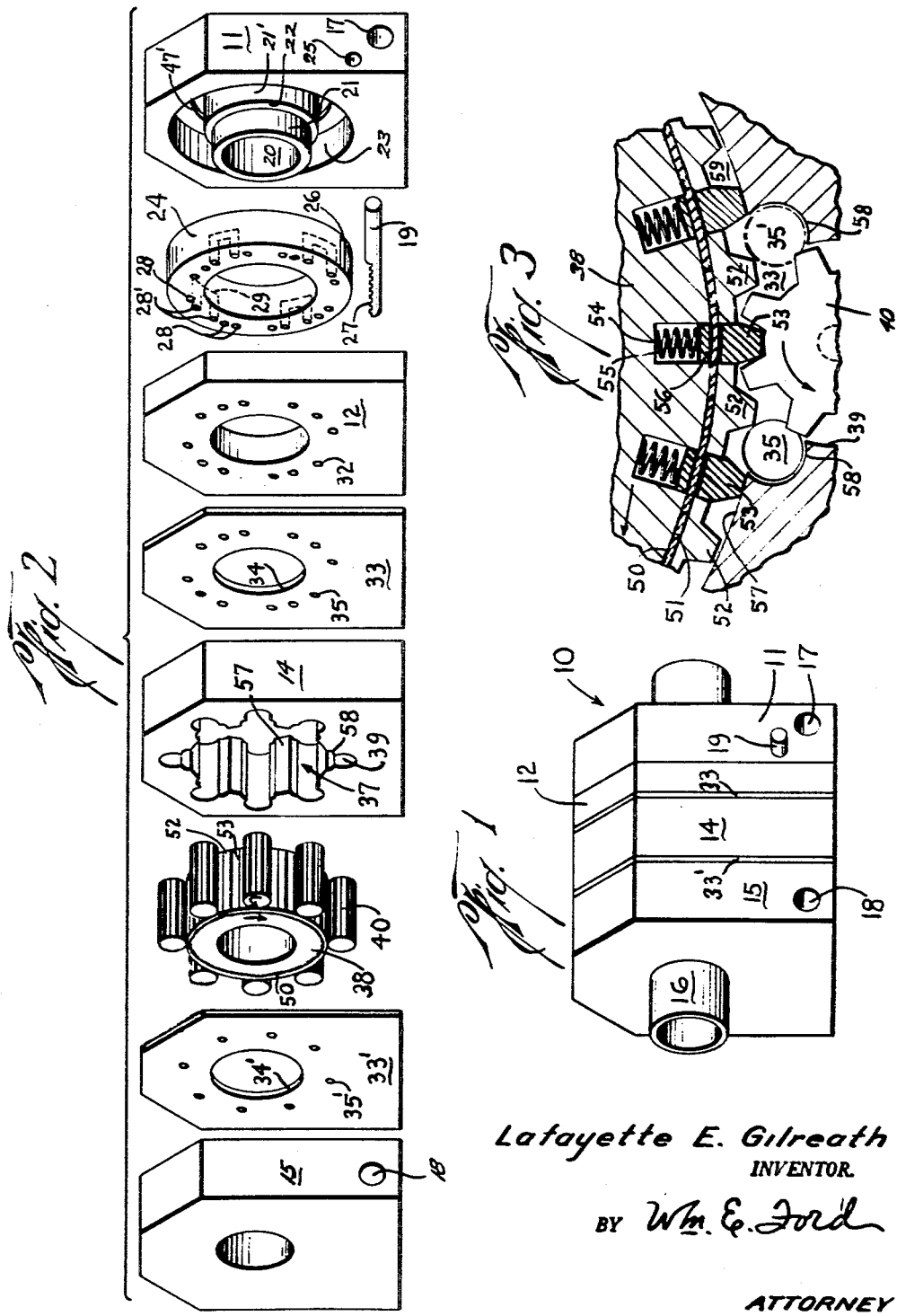
Lafayette E. Gilreath
INVENTOR.
BY Wm. E. Ford
ATTORNEY

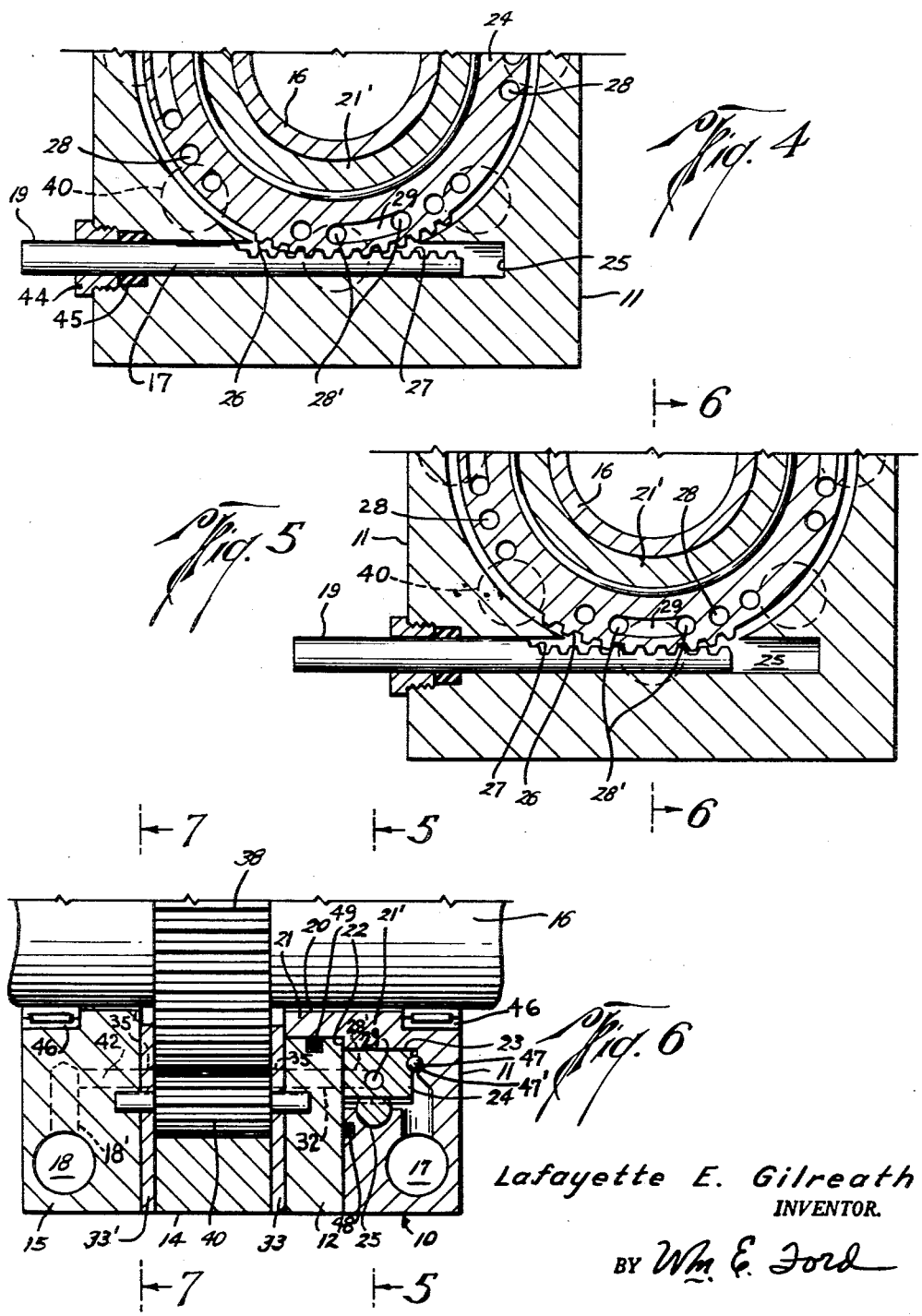

April 26, 1960
L. E. GILREATH
2,934,044
HYDRAULIC MOTOR
Filed June 15, 1959
4 Sheets-Sheet 3
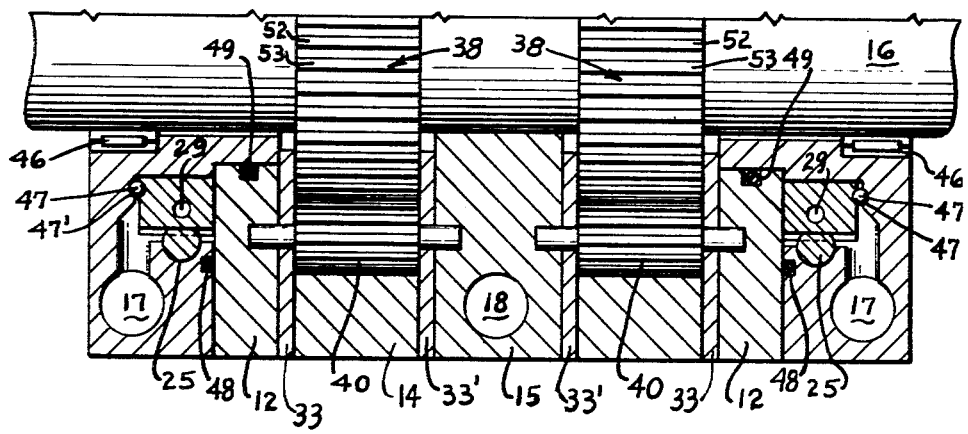
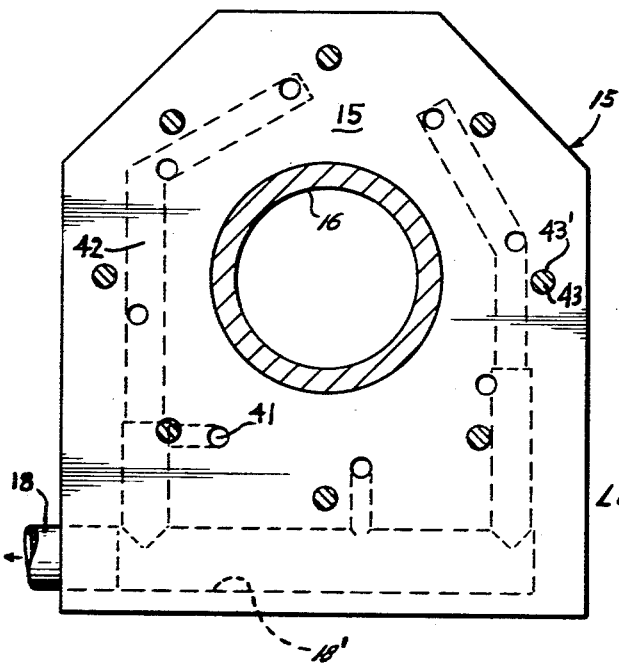
Lafayette E. Gilreath
INVENTOR.
BY Wm. E. Ford
ATTORNEY April 26, 1960     L. E. GILREATH     2,934,044
HYDRAULIC MOTOR
Filed June 15, 1959     4 Sheets-Sheet 4
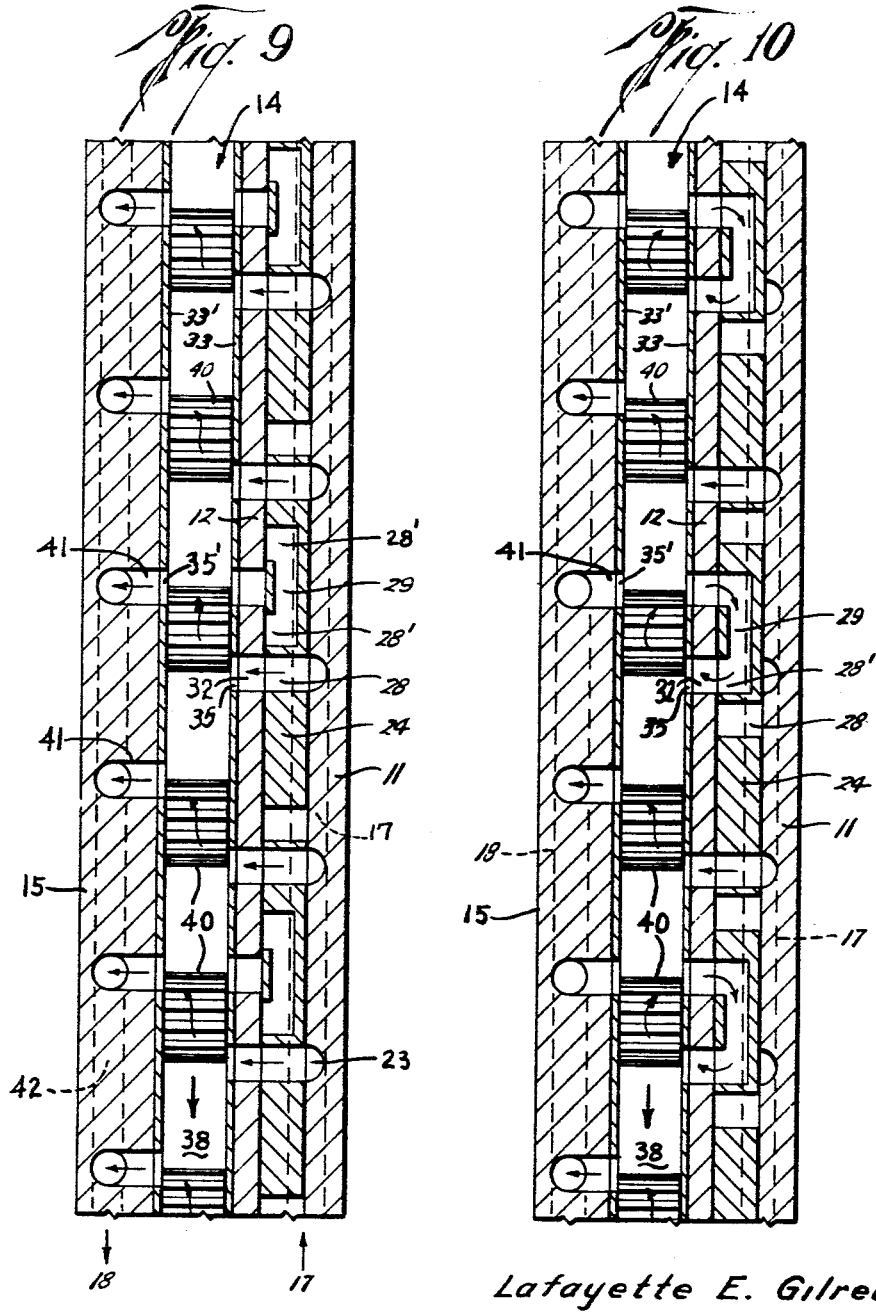
Lafayette E. Gilreath
INVENTOR.
BY Wm. E. Ford
ATTORNEY United States Patent Office 2,934,044
Patented Apr. 26, 1960

2,934,044

HYDRAULIC MOTOR

Lafayette E. Gilreath, Houston, Tex.

Application June 15, 1959, Serial No. 820,216

9 Claims. (Cl. 121—70)

This invention relates to a hydraulic motor adapted to handle a constant volume of fluid and adapted to vary combinations of torque and speed in manner to permit the selection of a plurality of such combinations at which such constant volume of hydraulic drive fluid is handled.

It is consequently a primary object of this invention to provide a hydraulic motor of this class adapted to have active therein at any instant a constant volume of hydraulic drive fluid operative to deliver at various torque speed combinations, such combinations being selectively incorporated into action to meet various service requirements.

It is another object of this invention to provide a hydraulic motor of this class in which selectivity of torque-speeds combination is obtained by unique cooperation of structural features adapted to selectively subtract and recirculate, without change of overall handled fluid volume, a part of the hydraulic drive fluid otherwise going to drive the main drive gear of the motor.

It is another and further object of this invention to provide a hydraulic motor of this class which attains its driving capacity by driving through a plurality of pinions spaced about a driven gear which in turn constitutes the drive gear for the shaft to which drive is imparted.

It is yet another object of this invention to provide a hydraulic motor of this class which includes means supported in the motor housing to selectively change from one effective torque-speed combination to another.

It is a still further object of this invention to provide a hydraulic motor of this class which is adapted to drive a variety of devices, such as power swivels for drilling oil wells, various transmission equipment, and a wide range of apparatus where a drive shaft may have rotation imparted thereto by a large fluid driven gear.

It is an additional object of this invention to provide a hydraulic motor of this class which may be constructed inexpensively of a minimum number of working parts, the motor being extremely light in weight and occupying a minimum volume of space in comparison with the power which it can deliver.

Other and further objects will be apparent when the specification herein is considered in connection with the drawings in which:

Fig. 1 is an isometric view showing a hydraulic motor embodying the principles of this invention and showing the relative arrangement of the parts comprising the hydraulic motor;

Fig. 2 is a development view showing isometrically the component parts of the motor exclusive of its shaft;

Fig. 3 is an enlarged fragmentary view showing the structural features of pinion and gear engagement including gear box-recess construction and the relative positions therein of fluid inlet and egress from such recesses, and the relation thereto of the alternate floating gear teeth;

Fig. 4 is a transverse fragmentary sectional elevation showing the arrangement whereby the selector ring for shifting from one torque-speed control to another is operated;

Fig. 5 is a view similar to Fig. 4 but showing the selector ring shifted to a position different from that shown in Fig. 4;

Fig. 6 is a longitudinal, fragmentary, sectional elevation taken along line 6—6 of Fig. 5;

Fig. 7 is a transverse elevational view, part in section, taken along line 7—7 of Fig. 6;

Fig. 8 is a transverse, fragmentary, longitudinal sectional view of an embodiment of the invention showing the employment of double driving gears;

Fig. 9 is a development view of an embodiment of the invention showing selector control set for delivery of maximum torque at lowest speed; and Fig. 10 is a development view of the embodiment of the invention shown in Fig. 9 in which the selector control is set for delivery of fluid at less torque and at greater speed than the delivery capacity determined by the selector control setting shown in such preceding figure.

Referring in detail to the drawings in which like reference numerals are assigned to like elements in the various views, a hydraulic motor 10 is shown in Fig. 1 comprising in sequential alignment an inlet head 11, a port plate 12, a wear plate 33, a gear case 14, a wear plate 33', and an exhaust head 15. A hollow shaft 16 is shown extending through the hydraulic motor assembly 10 hereinabove described. Also, a fluid inlet 17 is shown in the inlet head and a fluid discharge or outlet 18 is shown in the discharge head 15. Additionally, a selector bar 19 is shown extending from the inlet head 11 to be actuated to control torque-speed settings as will be hereinafter described.

Referring now to Fig. 2, the inlet head 11 is shown as having a bore 20 therethrough, such bore extending through a boss or extension member 21 extending inwardly of the head 11 past the normal thickness thereof. The outer portion 21' of such boss is of larger diameter than the inner portion thereof which is shown turned down to form a shoulder 22 in substantially the same transverse plane as the inner face of the inlet housing or head 11. An annular groove 23 is provided in such head 11 outwardly of the boss portion 21 to isolate and define the boss and for purposes to be hereinbelow described.

A selector ring 24 is also shown in Fig. 2 with inner diameter to fit over the boss 21' with clearance and with outer diameter slightly less than the outer diameter of the groove 23. The selector ring 24 has a toothed segment 26 in its periphery with teeth formed to mesh with teeth 27 formed in the inner portion of the selector control bar 19 which is shown in Fig. 2 and which is slidable in a transverse bore 25 provided in the head 11 and in which the control bar 19 is transversely slidable.

The inlet passage 17 discharges fluid into the outer portion of the groove 23, as will be hereinafter described, and such fluid passes inwardly into selector ring ports 28 which pass through the ring 24 from outer face to inner face. The selector ring 24 also provides ports 28' which are cross-connected by means of by-pass channels 29, and in such cases the ports 28' do not extend from outer face to inner face of the ring 24, but only extend from the inner face outwardly to be connected with the cross-connecting channels 29 within the interior of the ring 24.

Adjacent to the ring 24 and to the inlet head 11 there is provided a port plate 12 inwardly of such members, and such port plate has a bore 31 therethrough into which extends the inner portion 21 of the inlet head boss hereinabove described. The bore 31 has an annular groove 49 therein centrally thereof to receive an O-ring for establishing a seal against fluid passage, as between the port plate 12 and a member radially inwardly thereof, such as a roller bearing assembly interposed between a hollow shaft 16 as shown in Fig. 1 (but not shown in Fig. 2) and the port plate.

The port plate 12 provides therein ports 32 which pass therethrough from outer face to inner face and such ports 32 are upon the same defining circle as the ports 28 in the ring 24 and are correspondingly arranged in accordance with the spacing apart of the ports 28 upon their defining circle.

Inwardly of the port plate 12 a wear plate 33 is divided having a bore 34 therethrough in which the shaft 16 shown in Fig. 2 is rotatable. Such wear plate 33 has ports 35 which pass therethrough from outer face to inner face and such ports 35 are on a defining circle corresponding with the defining circle of the ports 32 and additionally the ports 35 are peripherally spaced apart about their defining circle in correspondence with the ports 32 and to match therewith so that there is full communication through the matching ports 32, 35 from the outer face of the port plate 30 to the inner face of the wear plate 33.

The gear case 14 is provided as the inner element of the hydraulic motor. Such gear case has a composite opening 37 therethrough so that the shaft 16 shown in Fig. 1 may pass through such opening with slight clearance between the gear case and an annular or ring gear 38 fixedly mounted on the shaft. Also recesses 39 outwardly of the ring gear 38 are provided to receive therein pinions 40 which are positioned at a plurality of equally peripherally spaced apart locations about the ring gear 38 and mounted to mesh with the teeth of the ring gear.

A wear plate 33' is provided just outwardly of the gear case 36 and on the opposite side thereof from the wear plate 33'. Such wear plate 33' has a bore 34' therethrough to receive for rotation therewithin the shaft 16 shown in Fig. 1. Ports 35' are provided in the wear plate 33' on the same defining circle as the circle defining the ports 35 in the wear plate 33, but fewer in number than the ports 35. Such ports 35' are angularly spaced apart in correspondence with corresponding ports 35 in the wear plate 33 but are angularly spaced in staggered relation as regards the ports 35 with which they correspond, as will be hereinbelow described.

The exhaust head 15, shown in Fig. 2, is shown in more detail in Fig. 7, and has exhaust ports 41 spaced about a defining circle of diameter of the defining circle of the wear plate ports 35' and peripherally spaced in correspondence with the ports 35' and to match therewith. Such ports 41 pass through the inner face of the exhaust head 15 and outwardly through passages 42 which communicate with an internal duct or manifold space 18' leading to the discharge conduit or discharge 18. The whole group of elements shown successively adjacent in Fig. 2 may be assembled as by through bolts 43 which extend through bores 43' in such elements into the outer face of the inlet head 11 and out through the outer face of the exhaust head 15. In order to accentuate the porting arrangement of the hydraulic motor the bores 43' through which the through bolts 43 pass, and also the through bolts 43, are omitted in Fig. 2 so as not to clutter this development view.

Further details of construction which enter into the operation of the machine may be pointed out at this time with reference to the various views. As shown in Figs. 4 and 5 the control bar 19 passes into the fluid inlet 25 in which a stuffing box is provided so that a gland 44 may be threaded into the head to compress a packing 45 to seal the fluid inlet 17 against leakage.

As shown in Figs. 2, 6 and 8, roller bearing assemblies 46 are provided in the inlet and exhaust heads to support the shaft 16 for anti-frictional rotation. Additionally annular grooves 47' are provided in the selector ring 24 and in the base of the groove 23 in the inlet head 11 to receive ball bearings 47 therein whereby the selector ring 24 may be moved with greater ease to selective speed control positions as will be hereinbelow described. In order not to complicate the development views of Fig. 2 these grooves 48 and 49 are omitted therefrom. Also to prevent fluid leakage annular grooves 48 and 49 are provided in the inlet head 11 and port plate 12, respectively, to receive O-ring seals therein. Also the axles of the pinions 40 extend through the wear plates 33 and 33' on opposite sides of the gear case 14 to be journalled respectively in the port plate 12 and the exhaust head 15.

Making reference to Fig. 3, circular grooves 50 are provided in the opposite faces of the ring gear 38 to receive therein a snap ring or hold-in ring 51. Alternate teeth 53 of the ring gear teeth 52, 53 are mounted in radially extending slots 54 in the ring gear 38 and such teeth 53 are floatable with relation to the ring gear 38 and are urged outwardly by springs 55 based in the grooves 54. Such floatable teeth 53 have grooves 56 in the opposite end faces thereof to receive therein the snap ring 51 with slight clearance, such clearance being sufficient to permit the springs 54 to urge the teeth 53 slightly radially outwardly to further degree than the extent of the rigid teeth 52 and into contact with the bore 57 which comprises part of the opening 37 in the gear case 14.

In operation let it be assumed that at outset the pairs of by-pass ports 28' are blanked off against the port plate 12 while eight of the selector ring ports 28 are in communication with eight of the ports 32 in the port plate, such being accomplished by moving the control rod 19 to rotate the selector ring 24 to accomplish this pre-designed condition.

This relation is shown in Fig. 9 which is a diagrammatic or development view in which the element to the right represents the inlet head 11 having the inlet passage 17 therein with pressure fluid being delivered therefrom into the annular groove 23 in the inlet head, such groove 23 being indicated diagrammatically by a succession of semi-circular openings in the right element or inlet head 11. To the left of the inlet head 11 the selector ring 24 is shown having the ports 28 therethrough to communicate with corresponding ports 32 in the port plate 12 and corresponding ports 35 in the wear plate 33 to the left of the port plate 12.

In this diagram or development view the pressurized fluid passes through the aligned ports 28, 32, 35 into the gear case 14. As shown in Fig. 3, which is a sectional view through the gear case looking to the right in Figs. 1, 2, 9, and 10, the gear case has recesses 58 therein interposed between the bore 57 and the pinion recesses 39, and in alignment with the wear plate ports 35 to communicate therewith. Also, as shown in Fig. 3, similar recesses 58 are interposed between the pinion recesses 39, on the opposite sides thereof, and the bore 57, to communicate with the discharge ports 35' into the discharge wear plate 33', such port 35' being shown in phantom in Fig. 3 since it would be behind the plane of vision on which the section of Fig. 3 is taken looking to the right, as hereinabove described.

As pressure fluid between the pinion teeth 60 forces the pinion 40 around, when successive pinion teeth come into communication with the rear recess 58 the pressure thereon is relieved as such rear recess communicates with the pressure relieved exhaust system, and such fluid is free to pass through the exhaust wear plate port 35' into the exhaust ports 41 in the exhaust head 15 (shown to the left in Fig. 9), and through the exhaust passages 42. As shown in Fig. 7, the exhaust fluid then can pass into the exhaust manifold 18' and out the exhaust or discharge pipe 18.

By this position of the selector ring 24 the condition exists as regards five successive openings from the inner face of the selector ring 24 as opposed by the outer face of the port plate 12, that successively two openings (the by-pass ports) are occluded, an opening (a port 28) is open, an opening (a port 28) is occluded, and an opening (a port 28) is open. In turn, and correspondingly, as regards the port plate 12, successively, a port 32 (straddled by the by-pass openings) is occluded, a port 32 is open, and a port 32 is open. The term open, as hereinabove applied, describes the condition when a selector ring port 28 is in fluid communication with a port plate port 32.

Under the condition hereinabove described all pinions are driven by pressure fluid entering the recess 58 to the lead thereof, and under this condition all by-pass ports 28' are occluded. As the pressure fluid is forced into the motor by a constant force, and as the motor has a predetermined volumetric space in which the pressurized fluid upstream of the rearward or exhaust recesses 58 is constrained in action, the motor, with the selector ring 24 in such hereinabove described position, will deliver its greatest torque at its slowest speed.

In the view of Fig. 9 the pinions 40 are indicated as turning clockwise if viewed from the right thereof, or as turning counterclockwise if viewed to the left thereof, and consequently in the sectional view of Fig. 3, looking to the right, the pinion 40 is indicated by the arrow thereon as turning counterclockwise and the ring gear 38 is consequently indicated by the arrow thereon as turning clockwise. The spacing of the teeth 52, 53 is such with relation to the recesses 58, 39, 58 that a closed chamber is formed by the leading spring urged tooth 53 just forwardly of the recesses 58, 39, 58 being urged against the bore 57, and the spring urged tooth 53 just rearwardly of the recesses 58, 39, 58 being urged against the bore 57.

Consequently, the fluid that has been carried along in entrapment between adjacent spring urged gear teeth 53 is freed when as such entrapment spaces 59 are successively brought into communication with the rear of the recesses 58, 39, 58 to pass thereinto in the course of gear rotation. At the same time the pressure fluid forced in through the wear plate port 35 drives the pinion 40 in counterclockwise direction by virtue of the pressure it builds up in the hereinabove defined closed pressure chamber, and the pinion 40 in turn drives the ring gear 38.

As shown in Fig. 10, the selector bar 19 has been moved to the selector ring 24 downwardly in such view, which would be the equivalent of rotating the ring 24 in a clockwise direction, as viewed in Fig. 2. This brings the pairs of by-pass ports 28' into communication with two adjacent ports 32 in the port plate 12. The flow port 28 next adjacent the by-pass ports 28' is then occluded by the port plate 12, while the flow port 28 successively after the occluded flow port is brought into communication with a flow port 32 in the port plate 12. The flow port 28 successively after the communicating flow port 28 on the other hand is occluded by the port plate 12. Corresponding relation exists as hereinabove described for each successively following five openings 28', 28 in the selector ring 24 with regard to each successively following three ports 32 in the port plate 12.

This selected arrangement has resulted in cutting out fluid communication from the pressure-fluid inlet through four of the flow ports 32 with the consequence that the torque exerted by the motor is decreased by substantially fifty percent, while the speed of rotation of the shaft 16 is substantially doubled. Under these conditions, as successive gear entrapped compartments 59 pass by by-pass ports 28' in rotation of the gear, there is fluid communication with the by-pass channels and consequently there is a larger volume for fluid than exists within a compartment 59 before it passes into such by-pass port communication.

Also the following compartment 58 of each opening 58, 39, 58, which compartment communicates with a wear plate exhaust port 35' on one side, communicates with a by-pass channel on the other side and thus the fluid passing by such an arrangement of by-pass ports, port plate ports, recesses, and exhaust port is pressure relived and exerts no driving force on the pinion 40 in the recess 39 of the combined recesses 58, 39, 58, but rather the fluid pressure all about the pinion 40 is equalized.

On the other hand, at the alternate pinions where the pressurized fluid is delivered through a selector ring port 28, port plate port 32, and wear plate port 35 into the forward recess 58 of a combined recess 58, 39, 58, the pinion is subjected to driving force, as hereinabove described in setting out the performance of the motor under conditions indicated by Fig. 9. The torque is consequently reduced, as above stated, since the effective driving contact area of the motor is reduced by one-half. On the other hand, since the same volume of fluid is delivered into the motor upstream of the rearward recesses 58, and since this fluid is under substantially the same pressure as heretofore described, the result is an increase in the speed of rotation to substantially twice the speed accomplished under full torque conditions, as indicated by Fig. 9.

In the motor construction hereinabove described two selective speeds are thus provided and the communication between four sets of matching ports is cut out or cut in by a shifting of the selector bar 19. It can be seen that various combinations may be provided in the selector ring 24 to accomplish selective speed changes, the port plate and wear plates being ported in correspondence with the arrangement of the selector ring, and the number of pinions 40 about the gear 38 also being provided in correspondence with the selector ring porting. A chart is provided hereinbelow setting forth the hereinabove described arrangement of eight pinions, two motor speeds, with increments of gradients of four ports being cut in or cut out upon change of speed. This chart also shows the number of by-pass ports, selector ring and port plate ports, and exhaust ports for an eight pinion, three speed, three port shift arrangement, and also for a four pinion, four speed, one port shift arrangement.

|  | Exhaust Ports | | Port Plate Ports and Selector Ring Flow Port | | Selector Ring By-Pass Ports | |
|---|---|---|---|---|---|---|
|  | Open | Closed | Open | Closed | Open | Closed |
| Eight pinions, Two speeds, Four port shift. | Eight (8) Ports<br>8<br>4 | 0<br>0 | Twelve (12) Ports<br>8<br>4 | 4<br>8 | Eight (4 pr.)<br>0<br>8 (4 pr.) | By-passes<br>8 (4 pr.)<br>0 |
| Eight pinions, Three speeds, Three port shift. | Eight (8) Ports<br>8<br>5<br>2 | 0<br>3<br>6 | Fifteen (15) Ports<br>8<br>5<br>2 | 7<br>10<br>13 | Twelve (6 pr.)<br>0<br>6 (3 pr.)<br>12 (6 pr.) | By-passes<br>12 (6 pr.)<br>6<br>0 |
| Four pinions, Four speeds, One port shift. | Four (4) Ports<br>4<br>3<br>2<br>1 | 0<br>1<br>2<br>3 | Ten (10) Ports<br>4<br>3<br>2<br>1 | 6<br>7<br>8<br>9 | Six (3 pr.)<br>0<br>2 (1 pr.)<br>4 (2 pr.)<br>6 (3 pr.) | By-passes<br>6 (3 pr.)<br>4 (2 pr.)<br>2 (1 pr.)<br>0 |

As is apparent from the chart, there are as many pairs of by-passes as there are selector ring flow ports and port plate port communications cut out in changes of speed. As to selector ring and port plate flow ports, there are as many of these as the total selector ring flow ports or port plate ports additively effective or open in the total of operative speed change positions. As to exhaust ports, the number of these are determined by the number of pinions, this number of pinions in turn determining the maximum number of port plate ports which are open at one time, such time being that at which the greatest torque, slowest speed combination is effective.

As shown in Fig. 8, a modified form of the hydraulic motor hereinabove described provides a double drive arrangement comprising successively, from left to right, an inlet head, selector ring, port plate, wear plate, gear case, wear plate, exhaust head, wear plate, gear case, wear plate, port plate, selector ring, and inlet head. Thus the exhaust port 18 exits centrally from the motor whereas there is provided an inlet 17 at either end thereof. The utility of this modification is apparent and its employment is dictated in cases where heavy load requirements necessitate a machine which can be provided within space limitations to deliver at higher power capacity than can be delivered by the motor disclosed in Figs. 1–7, inclusive, and Figs. 9 and 10.

In case it is desired to reverse the direction of rotation of the shaft 16, this can be accomplished by providing suitable cross-over piping and by-pass valving, such as a four-way valve, in such cross-over piping whereby the pressurized driving fluid may be forced into the exhaust pipe 18 to flow through the motor when the selector ring is set to place ports in communication corresponding with the maximum torque-slowest speed setting of the machine.

As the invention is conceived, it can be pointed out that the provision of wear plates on opposite sides of the gear case is a practical expedient but the invention can be practiced without such wear plates, and the gear case employed between port plate and exhaust head. Or, instead of employing the wear plates the inner surfaces of port plate and exhaust head may be particularly hardened to withstand the wear for which the employment of the wear plates is dictated.

As explained in the foregoing specification, and as is obvious when such specification is considered in connection with the drawings, and when the chart in column 6 is specifically considered, the invention must be susceptible to being practiced by the employment of a wide range of structural variations and embodiments. Thus the invention is not limited to the specification hereinabove and the disclosure of the drawings, but additionally includes all that wide range of variations, modifications, and embodiments of the invention as such may fall within the broad spirit of such invention and within the broad scope of interpretation claimed for, and merited by the appended claims.

What is claimed is:

1. A hydraulic motor comprising a pressurized fluid inlet head having a central passage therethrough and an annular groove in the inner face thereof spaced outwardly of said passage to provide a boss, a selector ring rotatably mounted on said boss and having successively therearound adjoined by-pass openings through the inner face thereof and flow ports therethrough, a port plate abutting the inner face of said selector ring having a central bore therethrough and outwardly thereof having ports therethrough corresponding in number to the flow ports in said selector ring and positioned in said port plate in correspondence with the positioning of said flow ports in said selector ring, a gear case having an opening therein including a central bore and pinion recesses peripherally spaced apart around said bore and extending outwardly therefrom, an exhaust head having a central bore therethrough and outwardly thereof having exhaust ports into the inner face thereof one positioned just rearwardly of each pinion recess, a fluid inlet into said inlet head to establish fluid communication with said groove and selector ring flow ports and a fluid discharge from said exhaust head into which said exhaust ports connect, a shaft extending centrally through said inlet head passage, said selector ring, said port plate bore, said gear case bore, and said exhaust head bore and having a ring gear thereon to turn therewith within said gear case bore, pinions in said pinion recesses to mesh with said gear and oppositely journalled in said port plate and said exhaust head and driven by pressure fluid passing through said fluid inlet, said groove, said selector ring flow ports, and said port plate ports which are positioned to discharge into said gear case just forwardly of said pinion recesses whereby said gear is driven to rotate said shaft therewith, said fluid forced rearwardly around said pinions discharging into said discharge ports and out said fluid discharge, and means to rotate said selector ring to place by-pass openings in communication with port plate ports and other selector ring flow ports in communication with other port plate ports whereby to select the number of flow ports delivering pinion driving fluid, and the number of by-pass connected flow ports serving to cut out fluid pressure balanced pinions from effective driving.

2. A hydraulic motor comprising a pressurized fluid inlet head having a central passage therethrough, a rotatably mounted selector ring inwardly of said inlet head and having successively therearound adjoined by-pass openings through the inner face thereof and flow ports therethrough, a port plate abutting the inner face of said selector ring having a central bore therethrough and outwardly thereof having ports therethrough corresponding in number to the flow ports in said selector ring and positioned in said port plate in correspondence with the positioning of said flow ports in said selector ring, a gear case having an opening therein including a central bore and pinion recessses peripherally spaced apart around said bore and extending outwardly therefrom, an exhaust head having a central bore therethrough and outwardly thereof having exhaust ports into the inner face thereof one positioned just rearwardly of each pinion recess, a fluid inlet into said inlet head to establish fluid communication with said selector ring flow ports and a fluid discharge from said exhaust head into which said exhaust ports connect, a shaft extending centrally through said inlet head passage, said selector ring, said port plate bore, said gear case bore, and said exhaust bore and having a ring gear thereon to turn therewith within said gear case bore, pinions mounted to turn in said pinion recesses and to mesh with said gear and driven by pressure fluid passing through said fluid inlet, said selector ring flow ports, and said port plate ports which are positioned to discharge into said gear case just forwardly of said pinion recessses whereby said gear is driven to rotate said shaft therewith, said fluid forced rearwardly around said pinions discharging into said discharge ports and out said fluid discharge, and means to rotate said selector ring to place by-pass openings in communication with port plate ports and other selector ring flow ports in communication with other port plate ports whereby to select the number of flow ports delivering pinion driving fluid, and the number of by-pass connected flow ports serving to cut out fluid pressure balanced pinions from effective driving.

3. A hydraulic motor comprising successively an inlet head having a central passage therethrough, a selector ring, a port plate having a central bore therethrough, a gear case having an opening therein including a central bore and pinion recesses spaced around said bore and extending outwardly therefrom, and an exhaust head, a gear shaft extending through said inlet passage, said selector ring, and said port plate, gear case, and exhaust head bores and mounting a gear in said gear case bore, pinions in said pinion recesses mounted to mesh with said gear, flow ports communicating with said inlet head and passing through said selector ring and adjoined by-pass openings into the inner face of said selector ring, ports through said port plate of number and correspondingly spaced as said selector ring flow ports and positioned to discharge fluid into said gear case opening just forwardly of said pinions, exhaust ports into exhaust head from just rearwardly of said pinions whereby pressure fluid is discharged from said port plate ports to drive said pinions to in turn drive said gear and rotate said shaft therewith as fluid forced rearwardly around said pinions is discharged through said exhaust ports and said exhaust head, means to rotate said selector ring to place said by-pass openings in communication with other port plate ports whereby to select the number of flow ports delivering driving fluid and the number of by-pass connected flow ports cut out of drive by balancing of fluid pressure through said by-passes.

4. A hydraulic motor as claimed in claim 3 in which said port plate includes a correspondingly ported wear plate as the inner face thereof and in which said exhaust head includes a correspondingly ported wear plate as the inner face thereof.

5. A hydraulic motor comprising successively an inlet head having a central bore therethrough, selective flow port providing means including means providing a bore therethrough, a gear case having an opening therein including a central bore and pinion recesses spaced around said bore and extending outwardly therefrom, and an exhaust head, a gear shaft extending through said inlet bore, said flow port providing means, gear case, and exhaust head bore and mounting a gear in said gear case bore, pinions in said pinion recesses mounted to mesh with said gear, flow ports provided to communicate with said inlet head and passing through said selective port providing means and positioned to discharge fluid into said gear case openings just forwardly of said pinions, exhaust ports provided to communicate into said exhaust head from just rearwardly of said pinions, whereby pressure fluid is discharged from said flow ports to drive said pinions to in turn drive said gear and rotate said shaft therewith as fluid forced rearwardly around said pinions is discharged through said exhaust ports and said exhaust head, and means operable to condition said selective port providing means to select the number of flow ports delivering driving fluid and to by-pass the rest of said flow ports to cut them out of drive by balancing of fluid pressure through said by-passes.

6. A hydraulic motor as claimed in claim 5 in which said selective flow port providing means includes a correspondingly ported wear plate as the inner face thereof and in which said exhaust head includes a correspondingly ported wear plate as the inner face thereof.

7. A hydraulic motor as claimed in claim 3 in which there are as many pairs of by-pass openings as there are port plate ports to be brought into communication therewith by rotations of said selector ring, and in which there are as many selector ring flow ports additively effective by the total rotations of said port selector ring, and in which the maximum number of port plate ports open at one time is equal to the number of pinions.

8. A hydraulic motor as claimed in claim 5 in which alternate teeth of said gear are resiliently urged outwardly and in which said gear includes hold-in band means connected with slight clearance to said alternate teeth.

9. A hydraulic motor as claimed in claim 5 in which a recess is provided in said gear case just forwardly and just rearwardly of each pinion recess to communicate respectively with flow ports and exhaust ports.

No references cited.